US010546213B2

(12) United States Patent
Scholzen

(10) Patent No.: US 10,546,213 B2
(45) Date of Patent: Jan. 28, 2020

(54) METHOD FOR EVALUATING THE AUTHENTICITY OF A PAINTING AS WELL AS A CORRESPONDING USE

(71) Applicant: Werner Scholzen, Hilden (DE)

(72) Inventor: Werner Scholzen, Hilden (DE)

( * ) Notice: Subject to any disclaimer, the term of this patent is extended or adjusted under 35 U.S.C. 154(b) by 252 days.

(21) Appl. No.: 15/672,464

(22) Filed: Aug. 9, 2017

(65) Prior Publication Data

US 2018/0060692 A1 Mar. 1, 2018

(30) Foreign Application Priority Data

Aug. 25, 2016 (DE) .......................... 10 2016 115 837

(51) Int. Cl.
| | |
|---|---|
| *G06K 9/00* | (2006.01) |
| *G06K 9/62* | (2006.01) |
| *G06K 9/52* | (2006.01) |
| *G06K 9/46* | (2006.01) |

(Continued)

(52) U.S. Cl.
CPC ......... *G06K 9/6212* (2013.01); *G06K 9/4642* (2013.01); *G06K 9/52* (2013.01); *G06T 7/0002* (2013.01); *B44F 11/02* (2013.01)

(58) Field of Classification Search
None
See application file for complete search history.

(56) References Cited

U.S. PATENT DOCUMENTS

| 8,930,302 | B2 | 1/2015 | Scholzen |
| 9,008,426 | B2 | 4/2015 | Schuler |
| 2005/0163374 | A1 | 7/2005 | Ferman |

(Continued)

FOREIGN PATENT DOCUMENTS

| DE | 102009023756 A1 | 1/2011 |
| EP | 2555160 B1 | 10/2013 |

OTHER PUBLICATIONS

Shamir ("Computer Analysis of Art", ACM Journal on Computing and Cultural Heritage, vol. 5, No. 2, Article 7, Publication date: Jul. 2012, pp. 1-11) (Year: 2012).*

(Continued)

*Primary Examiner* — Wei Wen Yang
(74) *Attorney, Agent, or Firm* — Marshall & Melhorn, LLC

(57) ABSTRACT

A method is provided for evaluating the authenticity of a painting which includes providing (10) a collection of a plurality of original paintings by a certain artist and creating (20) at least one digital image of each original painting from the collection of plurality of original paintings; detecting (30) classification data for each one of the digital images of each original painting of the collection using the WND-CHARM method, wherein the classification data a reference data record of classification data for original paintings by the artist; providing (40) an additional painting and creating (50) at least one digital image of the additional painting; detecting (60) additional classification data for the digital image of the additional painting using the WND-CHARM method and comparing (70) the additional classification data with the reference data record of classification data for original paintings, wherein on reaching or exceeding a minimum correspondence between the additional classification data and the reference data record, it is concluded that the painting is an original painting by the artist and otherwise it is a counterfeit.

10 Claims, 5 Drawing Sheets

(51) Int. Cl.
*G06T 7/00* (2017.01)
*B44F 11/02* (2006.01)

(56) References Cited

U.S. PATENT DOCUMENTS

| | | | |
|---|---|---|---|
| 2011/0096955 A1* | 4/2011 | Voloshynovskiy | G06K 9/00 382/103 |
| 2013/0315477 A1* | 11/2013 | Murray | G06F 16/58 382/159 |
| 2014/0270344 A1 | 9/2014 | Krishnamoorthi | |
| 2017/0109600 A1* | 4/2017 | Voloshynovskiy | G06K 9/4671 |

OTHER PUBLICATIONS

Pandey ("Computer Assisted Automated Detection of Knee Osteoarthritis using X-ray Images" Science & Technology, 2015, 1(2), 74-79) (Year: 2015).*
Lior Shamir, Distinguishing Between Abstract Art by Artists vs. Children and Animals: Comparison Between Human and Machine Perception; ACM Transactions on Applied Perception, May 2016, pp. 17:1-17:17, vol. 13, No. 3, Article 17.
Rafael C. Gonzalez, Digital Image Processing 2nd Edition, Copyright in 2002 by Pretice-Hall, Inc.
Lior Shamir, Department of Math and Computer Science, Lawrence Technological University, What Makes a Pollock Pollock: A Machine Vision Approach, pp. 1-12.
Lior Shamir, Impression, Expressionism, Surrealism: Automated Recognition of Painters and Schools of Art; ACM Transactions on Applied Perception, Feb. 2010, pp. 17:1-17:17, vol. 7, No. 2, Article 8.
Nikita Orlov, WND-Charm: Multi-purpose Image Classification Using Compound Image Transforms; NIH Public Access Author Manuscript; Jan. 2008, pp. 1-29.
Johnson C R et al: "Image processing for artist identification", IEEE Signal Processing Magazine; IEEE Service Center, Piscataway, NJ, US, vol. 25, No. 4, (Jul. 1, 2008), pp. 37-48, XP011228189, ISSN: 1053-5888, DOI: 10.1109/MSP.2008.923513.
Lyu et al: "A digital technique for art authentication", Proceedings National Academy of Sciences, US, vol. 101, No. 49, (Dec. 7, 2004), pp. 17006-17010, XP002601838, ISSN: 0027-8424, DOI: 10.1073. PNAS.0406398101 (found on Dec. 77, 2004).

* cited by examiner

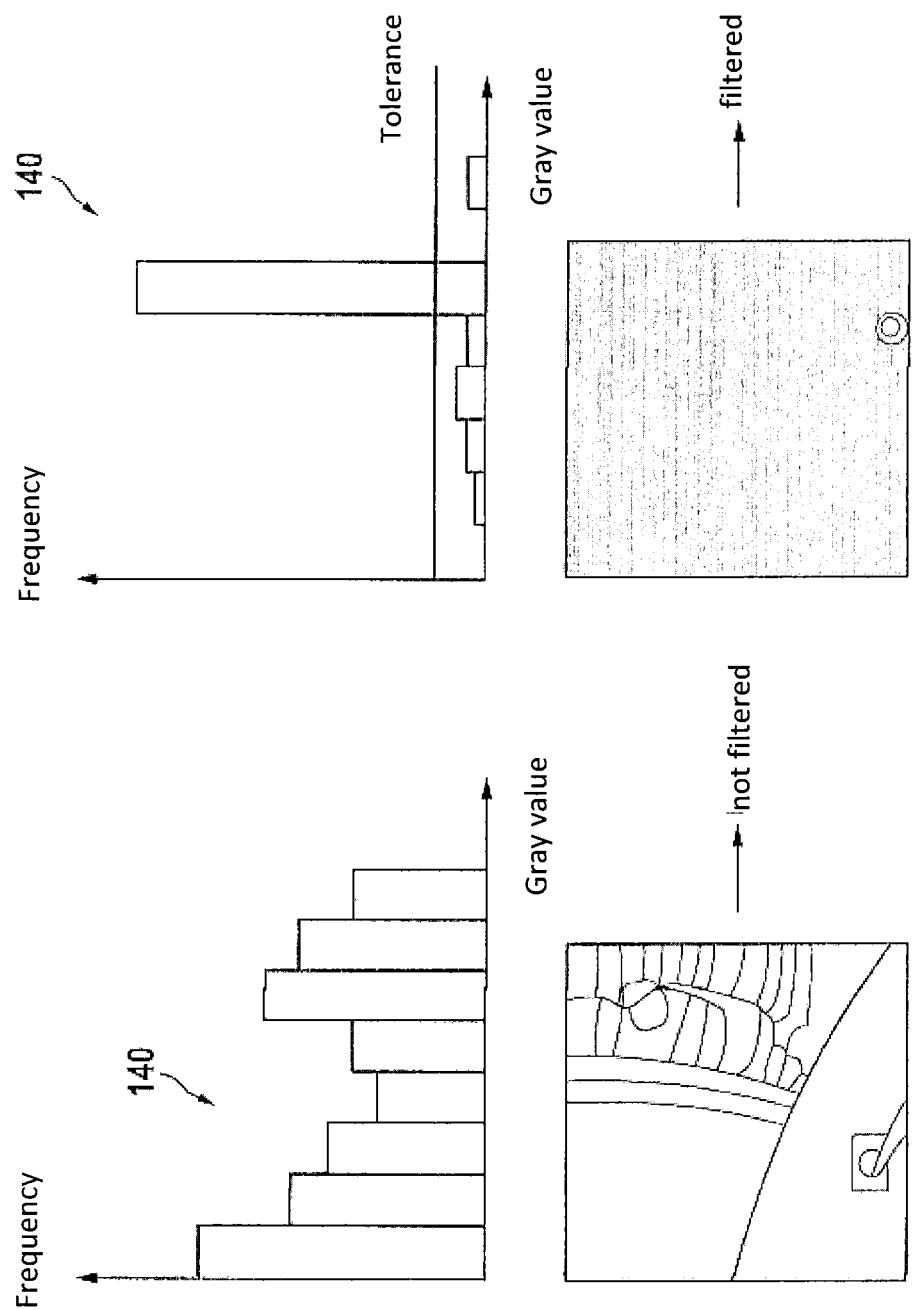

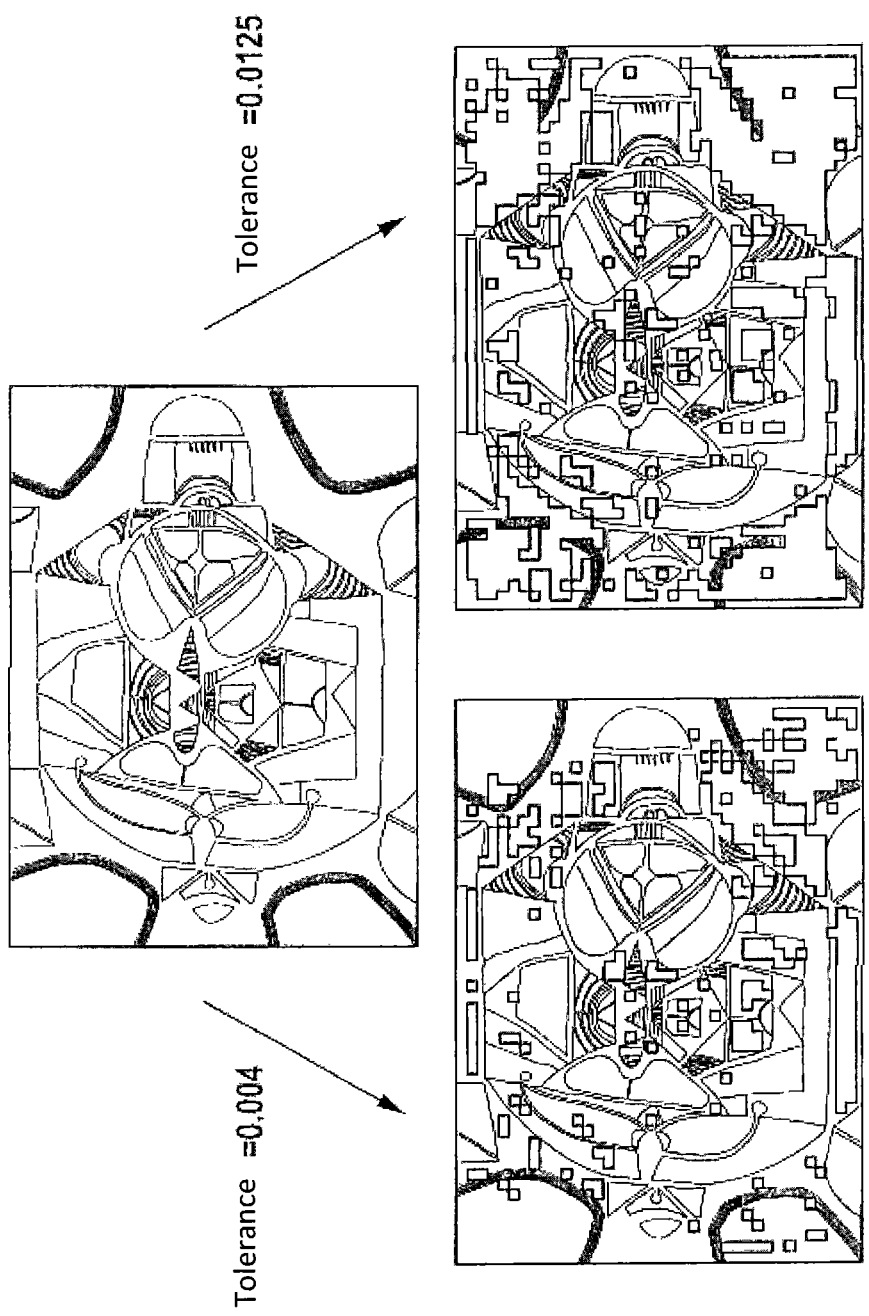

METHOD FOR EVALUATING THE AUTHENTICITY OF A PAINTING AS WELL AS A CORRESPONDING USE

BACKGROUND OF THE INVENTION

The invention relates to a method for evaluating the authenticity of a painting a well as a corresponding use.

DE 10 2009 023 756 B4 describes a method for verifying the origin and authenticity of images, comprising the steps:
a) Transferring the image to be verified or parts of the image to be verified to at least one data record with the help of a digitizing means, in particular a scanner;
b) Analyzing the data record(s) and determining characteristic features or parts of characteristic features, in particular points or lines or point groups or line groups or patterns that are contained in the data record in digitized form, wherein the characteristic features to be determined are stored in a database;
c) Wherein the determination of the characteristic features is performed in the data record(s) by comparing the data record(s) with the characteristic features present in the database and wherein the characteristic feature is assigned specifically with the help of pattern models of the characteristic features stored in a database;
d) Determination of reference features of at least one of the characteristic features or parts of the characteristic features, which are contained in the data record(s), wherein the reference features of the characteristic features are either stored already in the database or are generated during the ongoing process; and
e) Wherein the database has an additional assigned data record for each of these stored characteristic features.

The Hough method should preferably be used for analysis and determination of the characteristic features in the image to be verified or in portions of the image to be verified. However, use of the Hough has shown that it does not supply reliable results and therefore does not allow a reliable conclusion about the authenticity of a painting with sufficient certainty.

SUMMARY OF THE INVENTION

The object of the present invention is to further develop a method of the type described in the introduction such that it will allow a reliable evaluation of authenticity and consequently a reliable determination of the authenticity of a painting.

This object is achieved by a method having the features of claim 1. The other independent claim 10 relates to a corresponding use.

Accordingly, a method for evaluating the authenticity of a painting is described, comprising the steps:
a) Providing a collection of multiple original paintings by a certain artist and creating at least one digital image of each original painting in the collection of multiple original paintings;
b) Acquiring classification data for each one of the digital images of each original painting in the collection using the WND-CHARM method, wherein the classification data are a reference data record of classification data for original paintings by the artist;
c) Providing an additional painting and creating at least one digital image of the additional painting;
d) Detecting additional classification data for the digital image of the additional painting by using the WND-CHARM method and
e) Comparing the additional classification data with the reference data record of classification data for original paintings, wherein on reaching or exceeding a minimum correspondence between the additional classification data and the reference data record, a conclusion is drawn regarding whether this is an original painting by the artist or otherwise a counterfeit.

The invention is based on the principle of acquiring classification data on the basis of a collection of multiple original paintings by using the WND-CHARM method and subsequently also acquiring corresponding classification data for a painting to be verified also by using the WND-CHARM method. An original painting is concluded when a certain minimum correspondence is found in the classification data of the painting to be verified with the classification data in the reference data record, which may be freely selectable by the user. Studies have shown that even collections of 10 to 15 original paintings by a certain artist may be sufficient to generate a reference data record of classification data for original paintings by the respective artist, which will allow a reliable determination of originality of a painting to be verified.

The WND-CHARM method is described in its details in the publication "WND-CHARM: Multipurpose image classification using compound image transforms," Pattern Recognition Letters 29 (2008) 1684-1693. The analytical methods carried out according to the invention as part of the implementation of the WND-CHARM method are described in detail in the aforementioned earlier publication and should not be repeated here. It should be pointed out merely as an example that these analytical methods may be somewhat based on contrast, such as the edge detection by using Prewitt and/or Sobel operators, object-based analytical methods using OTSU masking as well as statistical methods including the analysis of histograms, averages, variances and/or min./max. analyses. Other possible methods include analysis of textures based on co-occurrence matrices according to the Haralick method or so-called Tamura textures. In addition, Fourier transforms, Chebyshev or Radon transformations and/or evaluations of the relevance of detected features can be performed with the help of a Fisher score analysis. All of the methods mentioned above and analytical methods going beyond these are covered by the WND-CHARM method and are related to one another within this method.

The Fisher score method originates from mathematical statistics and is used to estimate the best possible quality of parameters from a set of multiple parameters. This permits rating of individual ones of the features determined by the analytical methods mentioned above, so that optimization of results is achieved. Thus, for example, for each feature (i.e., a Tamura texture detected, a Haralick texture, a multi-scale histogram, etc., for example) a weighting can be obtained, which provides information about the relevance of the respective feature. Additional details for relevance testing with the help of the WND-CHARM method can be derived from the professional article cited above.

A further increase in the reliability of this method can be achieved by the fact that it also has the following steps:
aa) Providing a collection of multiple fake paintings by the artist and creating at least one digital image of each fake painting from the collection of multiple fake paintings;
bb) Detecting classification data for each one of the digital images of each fake painting in the collection of fake paintings using the WND-CHARM method, wherein the classification data is a reference data record of classification data for fake paintings; and ee) Comparing the additional classification data with the reference data record of classification data for fake paintings, wherein it is concluded that a painting is a counterfeit when a correspondence between the additional classification data and the reference data record of classification data for the fake painting is greater than the correspondence between the additional classification data and the reference data record of classification data for original paintings.

It has been found that even comparatively small partial image segments of an overall painting are suitable for being able to reliably determine the originality of a painting. It can therefore be provided that before the respective determination of classification data of the digital images of the original painting, of the additional painting or of the fake paintings, the respective digital image is broken down into partial image fragments, and the respective determination of classification data is carried out by at least one of the partial image segments.

The respective digital image can be broken down according to a first grid of adjacent partial image segments and additionally according to a second grid of adjacent partial image segments, wherein the first and second grids are displaced with respect to one another by an offset in at least one of two mutually perpendicular axes in the image plane of the digital image, and wherein the detection of classification data is carried out for the partial image segments broken down according to the first grid or a subset of these as well as for the partial image segments broken down according to the second grid or a subset of these. Before the respective acquisition of classification data for the respective digital image of the original painting, the additional painting or the fake paintings, a color value or gray value histogram equalization may be applied to the respective image. In doing so the total color value range available is utilized and by means of spreading of the input data, the existing color value range utilized is brought almost to an equal distribution over the entire available color value range.

On the one hand, to simplify the method and on the other hand to increase the reliability it is possible to provide that for homogeneous amounts, in particular for monochromatic and/or detail-free components of the respective digital image or of each respective partial image segment no classification data can be acquired. The homogeneous portions of the digital image can be detected on the basis of a color value histogram or a gray value histogram by defining a maximum amount of color values or gray values, which have a certain minimum incidence in the histogram, wherein a homogeneous amount is concluded when the number of color values or gray values having the minimum frequency in the histogram of the amount is smaller than the maximum number.

In addition before the detection, a soft focus, in particular a Gaussian filter may be applied to the respective digital image or to a partial image segment thereof in order to reduce the influence of impurities and/or scratches on the respective painting.

The digital images of the collection of a plurality of fake paintings and/or original paintings and likewise the image of the additional painting to be verified can be created photographically, in which case each image is supplied as an image data file comprised of a plurality of pixels.

According to another aspect the invention relates to the use of the WND-CHARM method in a method for evaluating the authenticity of a painting of the type described previously.

BRIEF DESCRIPTION OF THE DRAWINGS

Additional details of the invention are explained on the basis of the following figures, in which:

FIG. 4 illustrates the filtering of homogeneous image components; and

FIG. 5 illustrates the amount of the filtered homogeneous image components as a function of the selected filter tolerance.

DETAILED DESCRIPTION OF THE INVENTION

Figure 1:
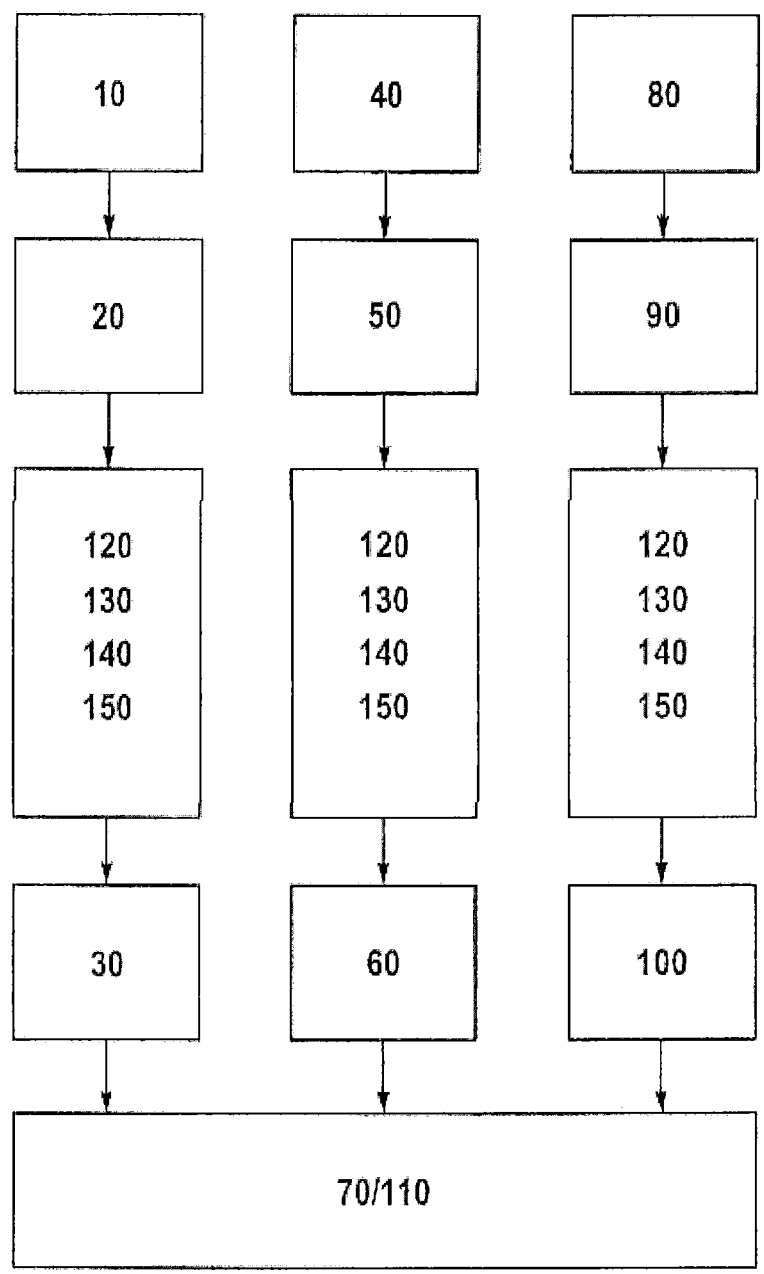
FIG. 1 shows a schematic flow chart for carrying out a method for evaluating the authenticity of a painting according to one embodiment of the invention.

To illustrate the method according to the invention in one embodiment, FIG. 1 shows a flow chart. Accordingly, in a step 10, a collection of a plurality of original paintings by a certain artist is provided. The collection may be subdivided according to additional differentiating features. For example, certain paintings of the collection may be assigned to a certain epoch. This can contribute toward an increase in data quality, inasmuch as the painting to be verified is subsequently compared only on the basis of the classification of the original painting, which belongs to the respective epoch in accordance with the effort to which it should belong.

In step 20, at least one digital image of each original painting of the collection is created, preferably by means of photography, so that the image created is made up of a plurality of pixels. To do so, a photographic apparatus having a conventional digital image sensor, for example, a CCD or CMOS sensor may be used.

In step 30, classification data for each one of the digital images of each original painting of the collection is detected by using the WND-CHARM method and the classification data form a reference data record of classification data for original paintings by the respective artist. The analytical methods used according to the WND-CHARM method are described comprehensively in the technical article WND-CHARM: Multipurpose Image Classification Using Compound Image Transforms, Pattern Recognition Letters, 29 (2008), 1684-1693.

In step 40, another painting to be verified for originality is provided, at least one digital image of this painting for testing being created in step 50. This can also be created again photographically in the manner described above. In step 60, classification data for the digital image of the additional painting is acquired using the WND-CHARM method.

To further improve the results of the verification, in a step 80, a collection of a plurality of fake paintings by this painter is provided. The fake paintings by this artist are characterized in that they appear to have been created by the hand of the artist of the original painting provided in step 10, although that is not the case, so that the fake paintings were in fact created by another artist. However, for the purpose of the invention, it is not absolutely necessary in particular for the fake paintings to be forgeries of original paintings by the artist, which are actually in existence. In at least some cases, it is also not necessary for the fake paintings to be paintings that are present in the collection of original paintings. It is likewise not necessary for the invention that the additional painting to be verified is a painting that is present in at least one of the collections of original paintings and fake paintings. According to the WND-CHARM method, the invention is based solely on acquisition of classification data acquired on the basis of original paintings by a certain artist and optionally on the basis of fake paintings attributed to that certain artist, in order to compare them as comparative classification data, optionally kept on reserve in a database after the initial acquisition with corresponding classification data of the digital image of another painting, whose authenticity is unknown, so that the originality of an additional painting can be deduced on the basis of the amount of correspondence in the classification data of the additional painting with the classification data of the original painting and optionally the classification data of the fake paintings.

It is up to the user where to place the percentage threshold of the degree of correspondence of the compared classification data to be able to deduce whether a painting is an original or a fake. However, it has been found that by using the CHARM method, there is still a trend with the method according to the invention to find—even with "good counterfeits"—a low correspondence of the detected classification data of the additional painting with the classification data of the original painting and/or an increased correspondence of the classification data of the additional painting with the classification data of the fake painting that could be detected, so that the originality or lack of originality could be determined correctly in 100% of the cases, based on the degree of correspondence of the classification data compared, and even with a random sample of 20 paintings, even with "good counterfeits" in which the classification data of the additional painting, and consequently, the counterfeit itself, have a certain degree of correspondence with the classification data of the collection of original paintings, it could still be possible to detect a trend toward a predominant deviation between the compared classification data of the original painting and/or a predominant correspondence with the classification data of the fake painting, and therefore it would be possible to make the correct assessment as a result.

In steps 70 and 110, the additional classification data is compared with the reference data record of classification data for original paintings and/or for fake paintings. In a comparison of the additional classification data with the reference data record of classification data for original paintings, it is concluded that the painting is an original painting by the artist when a minimum correspondence between the additional classification data and the reference data record and otherwise it is concluded that the painting is a counterfeit. In the comparison 110 of the additional classification data with the reference data record of classification data for fake paintings, it is concluded that the painting is a counterfeit if the correspondence between the additional classification data and the reference data record of classification data for fake paintings is greater than the correspondence between the additional classification data and the reference data record of classification data for original paintings, and wherein it is otherwise concluded that the painting is an original painting. According to the CHARM method, the various individual features tested for correspondence on the basis of the classification data can be weighted differently, so that in the case of 1000 individual features tested, for example, a deviation in a few relevant individual features, for example, 50 features, which are therefore weighted more strongly, would be indicative of a counterfeit.

It has been found that, when taken separately, the two comparisons 70, 110, have always led to the same result with regard to the determination of originality, so that the method according to the invention may have a system-imminent self-validation. If the result of step 70 were to turn out to be contrary to that of step 110, i.e., one step indicates that the painting to be verified is an original but the other step indicates a fake paintings, then it is possible to verify on the basis of this mechanism that a reliable determination of originality is impossible.

The painting to be verified, both the original painting from the collection of a plurality of original paintings as well as the fake painting from the collection of fake paintings as well as the other painting, which is to be verified for originality may be subjected to different preprocessing steps. These should in particular precede steps 30, 60, 100, i.e., the detection of the respective classification data, and should be aimed at simplifying the processing operation, for example, and/or increasing the yield in acquisition of classification data, i.e., increasing the data quality.

It is possible to provide that in a step 120 the respective digital image of an original painting, a fake painting or a painting to be verified for originality is broken down into partial image segments, wherein the respective detection 30, 60, 100 of classification data is carried out below for at least one of the partial image segments. Depending on the information density of the selected partial image segment, the analysis of one of the partial image segments may be sufficient to test the described originality and to carry it out with sufficient reliability, i.e., in particular to create a sufficient volume of classification data that will allow a reliable evaluation of originality.

Figure 2:
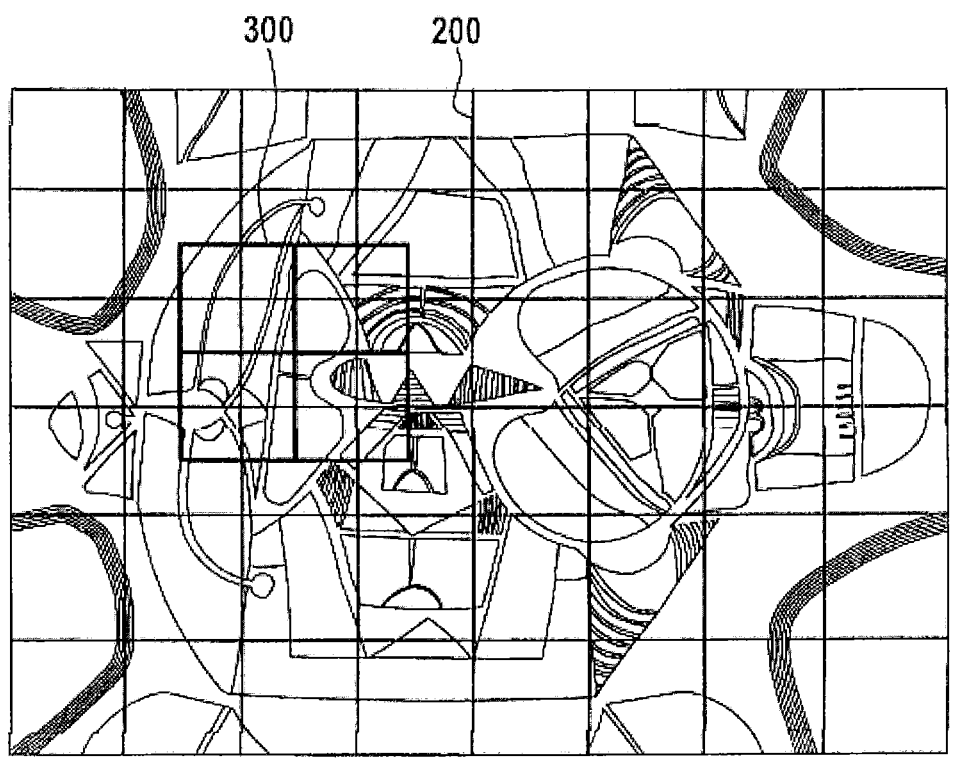
FIG. 2 shows an example of a digital image broken down according to a first grid and a second grid.

When the image is broken down into partial image segments, the respective digital image can be broken down according to a first grid 200 comprised of adjacent partial image segments and additionally according to a second grid 300 comprised of adjacent partial image segments, wherein the first and second grids 200, 300 are shifted by an offset in at least one of two mutually perpendicular axes in the image plane of the image. This is illustrated in detail in FIG. 2. The acquisition 30, 60, 100 of classification data can be carried out for the partial image segments broken down according to the first grid 200 as well as for the partial image segments broken down according to the second grid 300. For a better overview, FIG. 2 shows only partial details of the second grid 300. With the help of the grid shift described here it is possible to avoid information being lost in detection of structure or texture due to the fact that the aforementioned textures or structures are distributed beyond the dividing lines of the grid and thus are taken out of the context in acquisition of the classification data and are possibly not taken into account at all.

Figure 3:
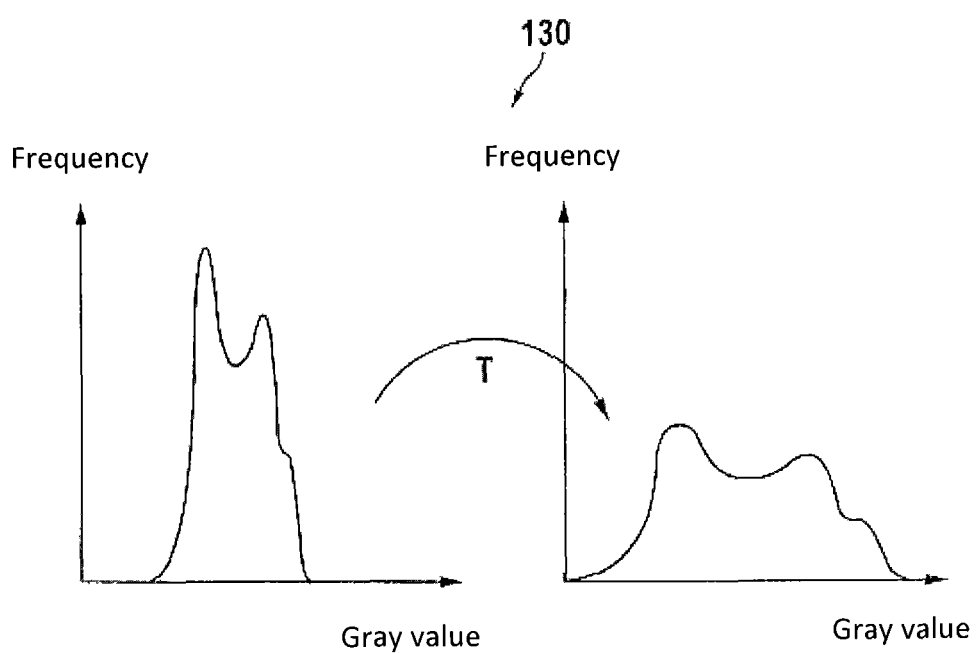
FIG. 3 illustrates schematically how a histogram equalization is performed.

As illustrated in FIG. 3, before the acquisition 30, 60, 100 of classification data, a color value or gray value histogram equalization can be applied to the respective digital image, in which the color spectrum or gray value spectrum used by the respective image is transformed to a complete available color space and/or gray value space, wherein the histogram equalization is applied either to the entire image or to a partial image segment.

With respect to FIG. 4 another measure is described for preprocessing of the digital images. In particular to simplify the process and at the same time to improve the quality of the classification data after the gridding of the digital image described with reference to FIG. 2, it is possible to provide that no classification data are acquired for homogeneous portions, in particular monochromatic portions and/or those without any detail in the respective digital image or a respective partial image segment. This is based on the assumption that the homogenous portions either have no classification data that can be analyzed or this classification data has no relevance with regard to the determination of originality because of the homogeneity of the image portion affected. For filtering out the homogenous portions, it is possible to provide that the digital image is acquired in one step 140 on the basis of a color value or gray value histogram by defining a maximum number of color values or gray values having a certain minimum frequency in the histogram. A homogenous portion is concluded when the number of color values or gray values having the minimum frequency is less than the maximum number in the histogram of that portion.

As an additional measure for preprocessing, before the acquisition 30, 60, 100, a soft focus and in particular a Gaussian filter may be used on the respective digital image and/or the processed partial image segment in a step 150 in order to reduce the influence of impurities and/or scratches on the respective painting. In the combined view in FIGS. 4 and 5, it can be seen that the amount of homogeneous image portions filtered out and/or partial image segments filtered out is increased or reduced with the tolerance threshold. The higher the tolerance threshold, the more image components can be filtered out. It is assumed here that inhomogeneous image constituents in particular are particularly suitable for the method described here for determination of originality. In the case of approximately monochromatic paintings it is therefore necessary to keep the tolerance threshold low and in particular to carry out widening of the histogram, which is described with reference to FIG. 3 in order to better work out the structures present in the painting.

The features disclosed in the preceding description and the claims and illustrated in the drawings may be important individually or in any combination for the implementation of the invention.

What is claimed is:

1. A method for evaluating the authenticity of a painting, comprising the steps:
    a) providing a collection of a plurality of original paintings by a certain artist and creating at least one digital image of each original painting from the collection of plurality of original paintings, wherein each digital image is acquired on the basis of a color value or gray value histogram by defining a maximum number of color values or gray values having a defined minimum frequency in the histogram, and defining any portion of each digital image as a homogenous portion when the number of color values or gray values having the minimum frequency is less than the maximum number in the histogram of that portion;
    b) after filtering out the homogenous portions, detecting classification data for each one of the digital images of each original painting of the collection using the WND-CHARM method, wherein the classification data define a reference data record of classification data for original paintings by the artist;
    c) providing an additional painting and creating at least one digital image of the additional painting;
    d) detecting additional classification data for the digital image of the additional painting using the WND-CHARM method and
    e) comparing the additional classification data with the reference data record of classification data for original paintings, wherein on reaching or exceeding a minimum correspondence between the additional classification data and the reference data record, it is concluded that the painting is an original painting by the artist and otherwise it is a counterfeit.

2. The method according to claim 1, which additionally comprises the steps:
    aa) providing a collection of a plurality of fake paintings by the artist and creating at least one digital image of each fake painting from the collection of a plurality of fake paintings;
    bb) acquiring classification data for each of the digital images of each fake painting of the collection of fake paintings using the WND-CHARM method, wherein the classification data is a reference data record of classification data for fake paintings by the artist; and
    ee) comparing the additional classification data with the reference data record of classification data for fake paintings, wherein a counterfeit is concluded when a correspondence between the additional classification data and the reference data record of classification data for fake paintings is greater than the correspondence between the additional classification data and the reference data record of classification data for original paintings.

3. The method according to claim 1, in which before the respective acquisition of classification data, the respective digital image is broken down into partial image segments and the respective acquisition of classification data is carried out for at least one of the partial image segments.

4. The method according to claim 3, wherein the respective digital image is broken down according to a first grid of adjacent partial image segments and additionally according to a second grid of adjacent partial image segments, wherein the first and second grids are shifted relative to one another by an offset in at least one of two mutually perpendicular axes in the plane of the digital image, and wherein the acquisition of classification data is carried out for the partial image segments broken down according to the first grid as well as for the partial image segments broken down according to the second grid.

5. The method according to claim 1, wherein before the respective acquisition of classification data, a color value or gray value histogram equalization is applied to the respective digital image, wherein the histogram equalization is applied either to the entire image or to a partial image segment.

6. The method according to claim 1, wherein no classification data is acquired for monochromatic portions and/or portions without detail of the respective digital image or a respective partial image segment.

7. The method according to claim 1, wherein before the acquisition, a soft focus is applied to the respective digital image in order to reduce the influence of contaminants and/or scratches on the respective painting.

8. The method according to claim 1, wherein before the acquisition, a Gaussian filter is applied to the respective digital image in order to reduce the influence of contaminants and/or scratches on the respective painting.

9. The method according to claim 1, wherein the digital images in the collection of a plurality of fake paintings and/or original paintings, the image of the additional painting is created photographically, wherein each image is provided as an image data file comprised of a plurality of pixels.

10. A method for evaluating the authenticity of a painting according to claim 1 utilizing the WND-CHARM method.

* * * * *